United States Patent [19]

Medlock

[11] Patent Number: 5,413,131
[45] Date of Patent: May 9, 1995

[54] PRODUCE WASHER

[76] Inventor: Harold G. Medlock, Box 7514, U.S. Hwy. 85, Fort Lufton, Colo. 80621-8824

[21] Appl. No.: 239,379

[22] Filed: May 6, 1994

[51] Int. Cl.⁶ .............................................. B08B 3/04
[52] U.S. Cl. .................................. 134/104.4; 134/111; 134/186; 134/133; 134/183; 15/3.15
[58] Field of Search ..................... 134/104.4, 105, 111, 134/133, 198, 155, 186, 183; 15/3.15

[56] References Cited

U.S. PATENT DOCUMENTS

| | | | |
|---|---|---|---|
| 1,465,085 | 8/1923 | Macabee | 134/104.4 |
| 1,931,565 | 10/1933 | White | 134/133 X |
| 1,951,046 | 3/1934 | Wuest | 134/66 X |
| 1,964,275 | 6/1934 | Secondo | 15/3.15 |
| 2,076,487 | 4/1937 | Wayland | 15/3.15 |
| 2,580,420 | 1/1952 | Griswold et al. | 134/104.4 X |
| 3,447,544 | 6/1969 | Vergara | 15/3.15 |
| 4,223,688 | 9/1980 | Nylund et al. | 134/104.4 |

*Primary Examiner*—Frankie L. Stinson

[57] ABSTRACT

An elongated open top tank containing water, one end being a loading end, and the opposite end being an exit end. Positioned transversely across the tank, spaced generally along the full length above the water line, are water distribution lines each having multiple water outlet nozzles aiming downward and at an angle toward the exit end of the tank. The distribution lines are connected to an output side of a high volume water pump used to circulate the tank water. The water pump draws water from the exit end of the tank so that during pumping, a strong current is created in the tank as the nozzles re-apply the water. Positioned transversely within the tank is a plurality of solid baffles, some positioned high in the water, and some positioned low in the water in a staggered arrangement. Produce deposited at the loading end of the tank is sprayed by the nozzles and drawn by the strong current. The current and nozzle output in conjunction with the high and low baffles forces the produce completely underwater in order for it to move underneath the bottom edge of the high baffles and over the top edge of the low baffles. The produce is moved in an agitating serpentine pattern as it moves toward the exit end of the tank to where an open screen conveyor is located in part in the water to lift the cleaned produce from the tank.

2 Claims, 4 Drawing Sheets

PRODUCE WASHER

BACKGROUND OF THE INVENTION

1. Field of the Invention:

This invention relates to devices for washing foreign matter such as dirt, insects, and chemicals from harvested produce such as radishes, beets and the like prior to the produce being boxed and distributed to grocery stores. The present invention is a high volume washer structured to rapidly and thoroughly wash the produce in a manner which is non-damaging to the produce or leaves on the produce. The present washer is also essentially a non-stop washer in that it may be installed in a continuous linear conveying arrangement where the produce is maintained moving in a single direction once the washing and boxing begins.

2. Description of the Prior Art

Although there have been other devices and systems for washing produce prior to distribution for sale to the consumers, I am not aware of any prior art which is structurally similar to the present invention. Some prior art techniques which have been employed have been as simple as spraying water over the produce with a garden hose, while other more sophisticated methods and devices have employed tanks of water for soaking the produce prior to a final spraying with a spray nozzle and water. Some produce cleaning systems have employed open chain or screen conveyors upon which the produce is placed, followed by the conveyor moving the produce underneath water spray nozzles.

It is clearly desirable to remove as much debris and foreign matter as possible, and in order to be able to sell the produce, it is also desirable to present the produce in a clean and non-damaged, fresh state. Although the prior art washing methods and structures are certainly better than nothing, they have significant shortcomings. One of the shortcomings is simply inadequate cleaning, leaving dirt on the vegetables or fruits, or on the leaves if left attached, such as with radishes. Another shortcoming is that excessively high water pressures often utilized in an attempt to improve cleaning and the rate of cleaning can often damage the produce, or in the case with radishes and other leafy produce, damage the leaves and thus render the produce less desirable to the consumer. Another shortcoming is simply the rate of processing, wherein a given amount of produce is cleaned and processed per man hour. It is and will continue to be important to be able to properly clean produce in a non-damaging manner, and at the highest possible rate.

It is the shortcomings in the prior art of produce washing which the present invention addresses and solves.

SUMMARY OF THE INVENTION

In addressing the shortcomings in prior art processes and equipment used to wash produce, I have developed a produce washer which is fast, and which thoroughly cleans the produce in a non-damaging manner, and therefore, I believe the present invention is a significant improvement in the art of produce washing. I have tested my invention on radishes and beets with very good results, and it is expected that the invention will function similarly well with other fruits and vegetables such as potatoes, carrots, citrus and the like. Radishes, unlike many of the fruits and vegetables which could be washed in the present washer, are packaged and sold in small bunches banded together with rubber bands or the like, and having the leaves still attached. It is important in selling such produce that the leaves appear fresh and non-damaged, being an indication of the condition of the edible portion. In most cases, my produce washer actually improves the appearance of the leaves on those types of produce sold with the leaves still attached, in that often a small number of the leaves are slightly yellowed, and will naturally disconnect more rapidly than the fresher leaves of the bunch, and the present washer is capable of removing most of these yellowed or older leaves.

In general terms, the present invention includes an elongated open top tank mostly filled with water, one end being a loading end, and the opposite end being an exit end of the tank. Positioned transversely across the tank, spaced generally along the full length above the water line, are a plurality of water distribution lines each having multiple water outlet nozzles aiming downward and normally at a slight angle toward the exit end of the tank. The distribution lines are connected, via a main water line, to an output side of a high volume water pump. The water pump draws water from the exit end of the tank so that during pumping, a strong current is created in the tank as the nozzles apply the drawn water aimed slightly toward the exit end, and also as the pump draws water from the exit end of the tank. The water in the tank is in effect circulated by the water pump. Positioned transversely within the tank is a plurality of baffles, some positioned high in the water, and some positioned low in the water so that produce deposited at the loading end of the tank is sprayed by the nozzles and pushed underwater, and drawn by the current. The baffles are offset from one another along the internal length of the tank, so that essentially every other baffle is a high or upper baffle, and in between each of the upper baffles is a lower or bottom baffle. The strong current and nozzle output in conjunction with the high and low baffles forces the produce completely underwater in order for it to move underneath the high baffles, and then up and over the low baffles in a serpentine pattern toward the exit end of the tank. The produce is moved in an up and down repetitive cycle as it moves beyond the baffles toward the exit end of the tank. The serpentine course the produce is forced to take has the effect of greatly lengthening the distance of travel through the tank, and the nozzle output and up and down course of the strong current in effect agitates the produce, and thereby the produce is cleaned of foreign matter, and the older or yellowed leaves are removed in a non-damaging manner from the fresh leaves. When the produce rises completely to the surface during its travel through the tank, the nozzles spray high volumes of water against the floating produce to add to the overall cleaning, and to force it back underwater into the main current to be further carried to the exit end of the tank. Because the produce is floating, the nozzle output pressure may be significantly higher than if the produce were resting on a solid surface, and in the case of radishes, the nozzle output pressures may be quite high, such as up to 30 PSI before damage occurs to the radish leaves, since the water allows the leaves to move downward and away from the hard nozzle spray, or in other words, the water in which the radishes float serves as an impact absorber to significantly reduce damage to the produce and leaves even with relative high nozzle spray pressure which does in fact lead to improved cleaning. Spray pressure against radish leaves which are not floating in water, such as when the radishes are being sprayed on a moving conveyor as common in the prior art, is typically limited to less than 10 PSI, as pressures higher than this will cause damage to the leaves when they are pressed against what is in effect a solid backing.

A chain or open screen conveyor is preferably located at an angle and in part in the water at the exit end of the tank to lift the cleaned produce from the tank.

DESCRIPTION OF THE PREFERRED EMBODIMENT

Figure 1:
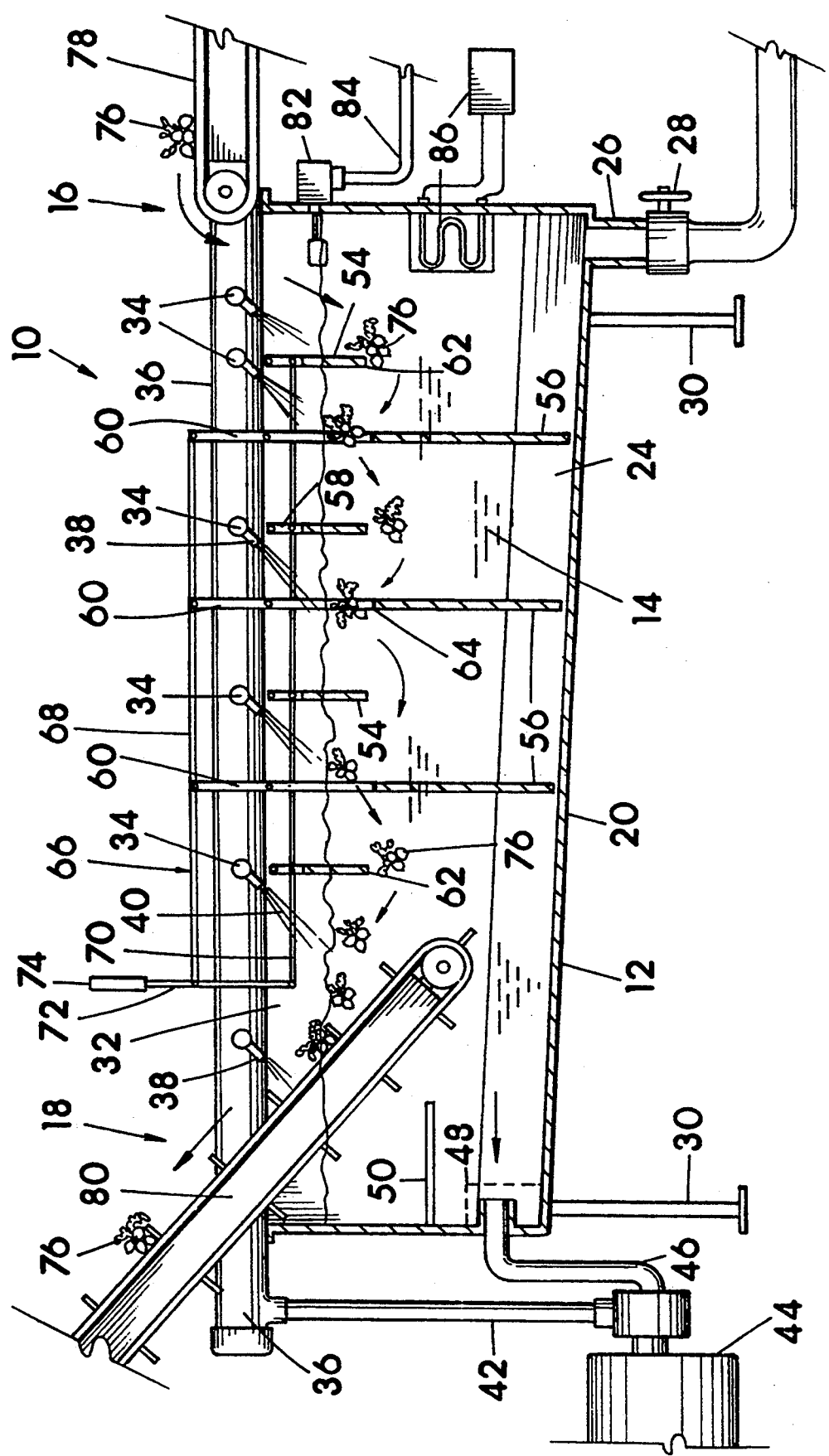
FIG. 1 is a partially cross sectioned side view of the preferred embodiment of the present produce washer shown operating and washing bunches of radishes.
Figure 2:
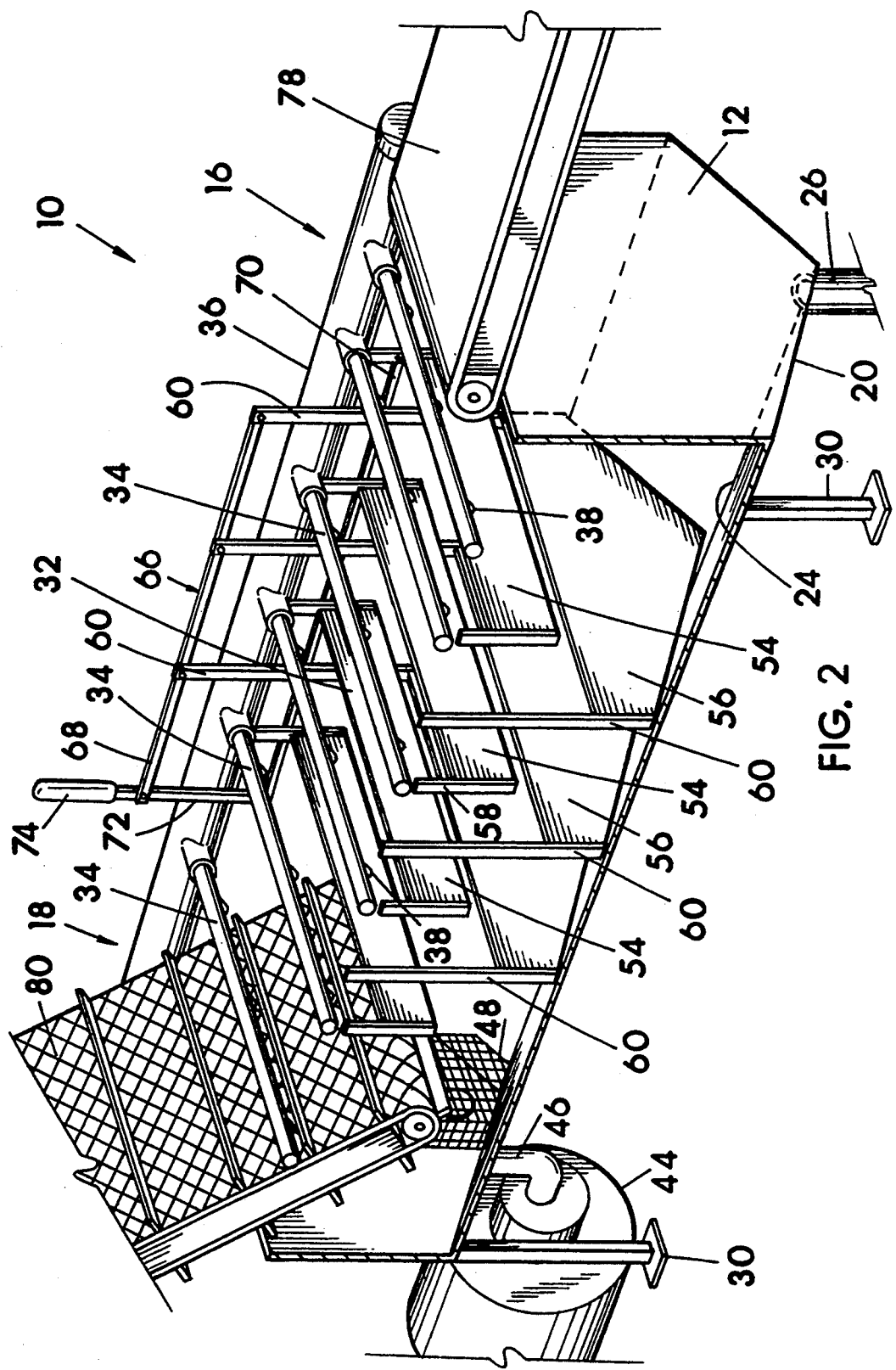
FIG. 2. is a partially cross sectioned perspective view of the produce washer.
Figure 3:
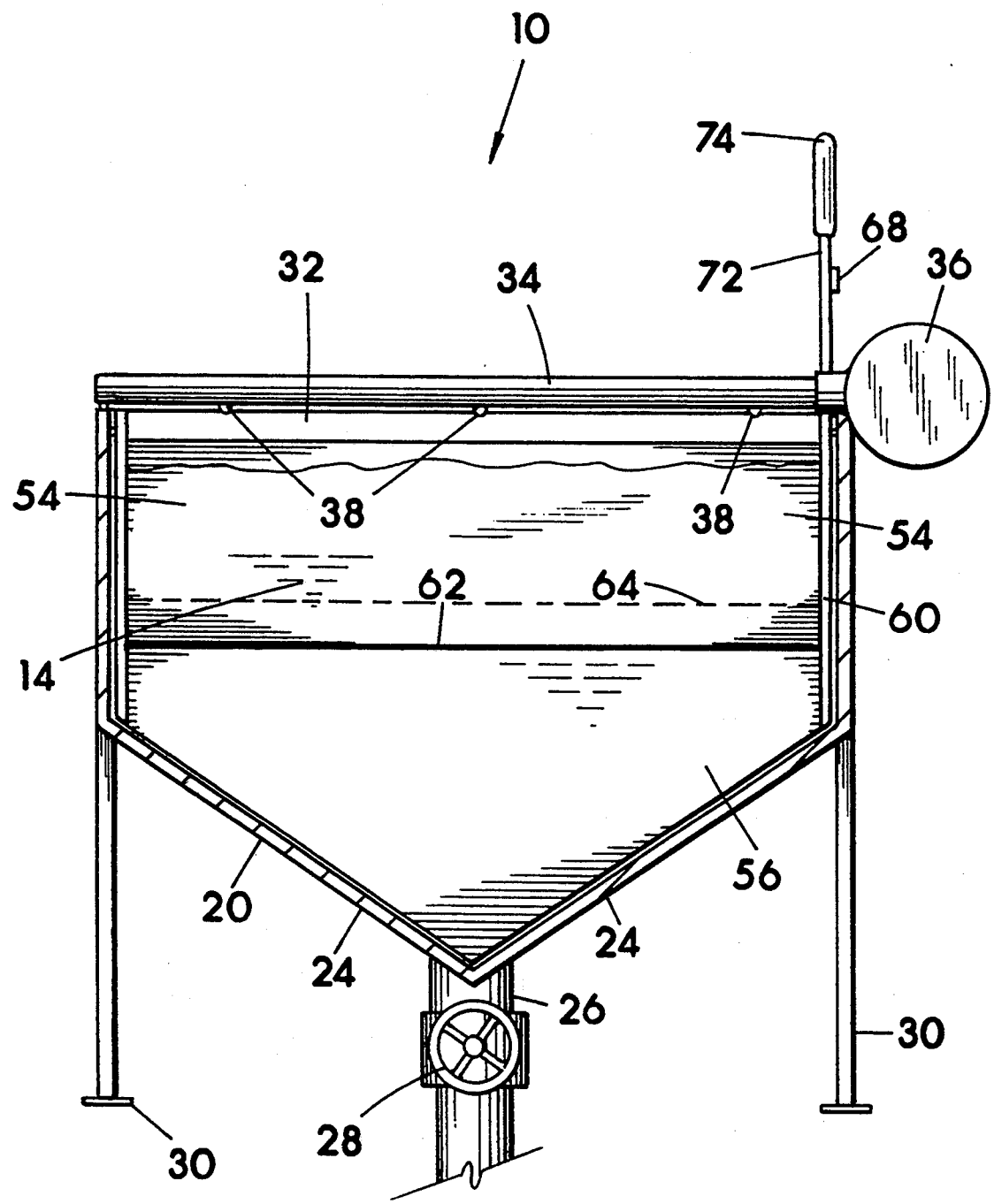
FIG. 3. is a partially cross sectioned end view of the produce washer.

The following detailed description is of a preferred embodiment for carrying out the invention, and although there are clearly some changes which could be made to that which is specifically herein described and shown in the included drawings, for the sake of briefness, all of these changes which are believed to fall within the scope of the invention have not herein been detailed, but should be apparent to those skilled in the art. Referring now to the drawings and to FIG. 1, where an example of the present invention is illustrated as produce washer 10. Produce washer 10 includes an elongated open top rectangular tank 12 having two long side walls; two short end walls, and a bottom 20 all connected to one another to be able to contained water. During operation, tank 12 is maintained mostly full of water 14. One end of tank 12 is designated the loading end 16, where produce to be washed is introduced into the tank, and the oppositely disposed end of tank 12 is referred to as the exit end 18 where the washed produce is removed from the tank. Tank 12 is preferably manufactured of metal such as stainless steel, although other materials such as plastics or fiberglass may be suitable. The bottom 20 of tank 12 slopes downward from exit end 18 towards loading end 16 for easier drainage of water 14, and cleaning of the tank, as when the tank 12 is drained, the water flushes dirt and mud from the bottom of the tank 12. For even greater assistance in drainage of water 14 and debris 22 from tank 12, bottom 20 contains a lengthwise central downwardly angled bevel 24. Bevel 24 terminates in loading end 16 at the opening of drain line 26 positioned in the lowest portion of the tank 12 so that all debris 22 may be flushed into the drain opening. The bottom of tank 12 may be viewed as a sloped V-shaped bottom. Drain line 26 is a large pipe affixed with a valve 28 for periodic elimination of the waste water and debris 22, for example at the end of a day or eight hour shift. Tank 12 is preferably supported by multiple support legs 30.

Positioned transversely across the open top 32 of tank 12 are a plurality of water distribution lines 34. Water distribution lines 34 are elongated horizontally disposed water pipes connected to and supplied pressurised water by a large main water line 36. Each distribution line 34 has several spray nozzles 38 which direct a relatively high pressure spray 40 of water, 20 to 30 PSI, down into the open top surface 32 of tank 12 and into the water 14 contained in the tank. The water output from each nozzle 38 is also a relatively high volume. The nozzles 38 on a given distribution line are all aligned or aiming in the same direction, which is downward toward the water 14 in tank 12, and normally aiming slightly toward the exit end 18 of the tank 12 to assist in defining the current of water within the tank which moves from the loading end 16 toward the exit end 18. Preferably each of the distribution lines 34 is connected to the main water line 36 in a manner which allows the manual rotation of the distribution line 34 in order to reposition the nozzle 38 angle relative to water 14 in the tank, and this may be accomplished with a threaded connection between the distribution lines 34 and the main water line 36. The ability to alter the angle of nozzles 38 toward the water in the tank 12 will have an effect on the length of time the produce remains in the tank 12 via the strength and speed of the current moving from the loading end 16 toward the exit end 18, and thus the cleaning of the produce. The large main water line 36 generally comprises a relatively large pipe positioned lengthwise and affixed on one side of tank 12. Main water line 36 receives water via an output line 42 from a high volume water pump 44, located near exit end 18 of tank 12. A suction or return line 46 attached to tank 12 at exit end 18 which is in communication with the water 14 within tank 12, directs water into pump 44 from the lower central end of exit end 18 of tank 12. A screen 48 covers the opening of return line 46 within tank 12 to prevent aspiration of debris 22 into the pump 44. Positioned just above the opening of return line 46, and within tank 12 and water 14, is a short flat plate 50, which helps prevent a vortex or whirlpool effect in water 14 which could potentially damage or reduce the effectiveness of pump 44 should air be drawn down through the vortex into return line 46. Pump 44 is a high volume pump, being powered by a 25 to 100 horse power motor, depending upon the overall size of washer 10, and in a tank 12 having three or four feet of standing water 14, the pump 44 could easily cause a vortex leading to air being drawn into the pump, and plate 50 will prevent this vortex.

The interior of tank 12 contains a plurality of water impervious baffles 52, which help direct water 14 in a specified course or current. There are two types or positions of baffles 52; upper baffles 54 and lower baffles 56. The upper baffles 54 are comprised of flat rectangular solid panels which are transversely suspended on edge within water 14 by support arms 58. Support arms 58 generally consist of elongated rigid members such as angle iron affixed vertically oriented along both ends of baffles 52 and generally within tank 12. Support arms 58 are pivotally affixed toward the upper ends thereof to the upper lengthwise edge of tank 12 with the pivotal connection being made just above the water line to prevent leaking. Positioned between and below each of the upper baffles 54 are the lower baffles 56, which are positioned transversely on edge along the beveled bottom surface 20 of tank 12, and extending upward from bottom 20. Lower baffles 56 are also thin flat solid panels, but the lower bottom edges thereof are beveled or V-shaped to conform to the beveled 24 bottom of tank 12. Lower baffles 56 are supported (bolted) on similar but longer support arms 60 which are also pivotally affixed to tank 12 toward the upper edge of the tank and above the top water line within tank 12 much like support arms 58. A portion of each support arm 60 extends upward beyond the pivotal connection for reasons to be detailed. Both baffles 54 and 56 are intended to block or direct the flow of water in a current, so as to force the water current to move around the transverse edge of the baffles within the water. The horizontal bottom edges 62 of the upper baffles 54 are positioned approximately 18 to 24 inches below the surface of water 14 in tank 12 and terminate above bottom 20 of the tank 12, the specific extension down into the water 14 and termination point above bottom 20 depending upon a number of factors such as strength of water current, the type of produce, depth of tank 12 and water 14 in the tank, and the volume of water and pressure thereof from nozzles 38 to name a view main factors. The upper edges 64 of lower baffles 56 are positioned approximately 2 feet up from bottom 20 of tank 12, and preferably higher in elevation than the bottom edges 62 of upper baffles 54, thus creating a serpentine underwater channel or course the current of water created by the pump must take in order to flow from the loading end 16 to the exit end 18 of tank 12. The upper edges 64 of lower baffles 56 terminate below the top of the water within tank 12 so that produce may float or move over the top of the lower baffle 56 and thus move closer to the exit end 18 of tank 12. For example, with a tank 12 having approximately 3 feet of water depth therein, upper baffle 54 might extend under the water 2 feet and terminate 1 foot above the bottom 20 of tank 12, and lower baffle 56 might extend upward from bottom 20 and terminate 1 foot below the top of the water in tank 12, and thereby the baffles 54 and 56 overlap one another in elevational extensions. Since the baffles 54 and 56 are at different spaced intervals relative to one another, being a foot or so apart, or in other words are staggered in placement along the length of tank 12 as shown in FIG. 1, wherein every other baffle is a upper baffle 54, and in between each upper baffle 54 is a lower baffle 56, water current moving from loading end 16 of tank 12 toward exit end 18 of the tank will move up and over a bottom baffle 54 and then down and below a upper baffle 54 in a serpentine path as the water moves toward the exit end 18 of the tank 12. The produce being washed will be carried along this same serpentine path by the current, and this will have a significant cleaning effect as the produce is repeatedly drawn completely underwater, and when the produce rises to the surface, it is sprayed from nozzles 38 momentarily, and then driven and drawn back down underwater to move underneath the next upper baffle 54 and closer to exit end 18. The water output from nozzles 38 helps clean the produce, but it also pushes the floating produce under water and into the serpentine current to be carried further toward the exit end 18 of tank 12. Preferably the upper baffles 54 are adjustably supported to allow the effective overlap of the upper and lower baffles to be adjusted, and thereby the severity of the serpentine current path may be altered. A sharply curved serpentine course for the water current will normally move slower through the tank 12, and produce carried by this course will remain in tank 12 longer, and thus be better cleaned, however slower overall production may result, and therefore adjustment in the elevational overlap of the baffles 54 and 56 is desirable for different types of produce having varying degrees of dirt thereon. Produce which is very dirty, particularly with dry mud, is more difficult to clean than some relatively clean produce which could be sent quickly through the washer in a relatively straight water current course.

Loading end 16 of tank 12 is the entry position for the agricultural product, which, in the illustrations are depicted as small pre-bunched units of radishes 76 for example The water level in tank 12 is preferably near the top of the tank 12 when the radishes 76 are introduced. Radishes 76 are deposited in water 14 in tank 12 from an inlet conveyor 78 in front of the first upper baffle 54. Inlet conveyor 78 could be an optional feature, since the produce could be manually deposited into loading end 16, essentially being hand dumped from boxes When the produce is dumped into the water 14, a wall of spray 40 ejected from the nozzles 38 of the first water distribution line 34 at an angle toward the first upper baffle 54 forces the radishes 76 forward and drives them underwater, into the current, and under the bottom edge 62 of the first upper baffle 54. The lower baffles 56 redirect the current of water 14 upward again towards the next upper baffle 54 at which point normally the produce will again surface Then a second wall of spray 40 is ejected from the second water distribution line 34 which forces the radishes 76 again underwater where the procedure is repeated by the remaining upper and lower baffles 52 and spray nozzles 38. The distance of travel underwater for the radishes is mainly determined by the distance underwater the upper baffles 54 extend. The tank 12 length and size, and the number of baffles 52 can certainly be varied within the scope of the invention. The constant agitation of the water 14 and the radishes 76 by the spray 40 and the dunking underwater helps thoroughly dislodge any debris 22. Debris 22 can consist of dirt, bugs or dead or loose leaves, which primarily sink to the bottom surface 20 of tank 12. When the radishes 76 reach the exit end 18 of tank 12, a porous screened exit conveyor 80 removes the produce from the tank 12, although other removal methods such as hand operated dip nets might be utilized. The end of the exit conveyor 80 is tilted downward and positioned underwater 14 to more easily pick up radishes 76. The open weave nature of the screened belt of exit conveyor 80 allows water 14 to pass through and drain back into tank 12. The exit conveyor 80 grabs the cleaned radishes 76 with paddles and gently lifts the produce out of the water and directs it on to further processing, which is normally boxing for shipment. During operation, all nozzles 38 are putting out continuous streams of water.

To maintain a constant level of water 14 within tank 12, a water level control 82 may be used which automatically adds more water 14 into tank 12 as the level is lowered. The water level control 82 depicted in the illustrations includes a float to open and close a water inlet pipe, and is similar to a toilet bowl filler, although other methods are acceptable. The water level control 82 is necessarily connected to a water inlet line 84 which is connected to some source of water under pressure.

The temperature of water 14 within tank 12 should normally be kept fairly cool in order to maintain freshness of the produce and also to help revitalize slightly wilted leaves, depending upon the type of produce being washed. An automatically controlled refrigeration unit 86 is therefore preferably suggested as an accurate and simple way in which to maintain a desired temperature, although the periodic addition of ice or cold ground water would also be effective at maintaining a proper water temperature.

Figure 4:
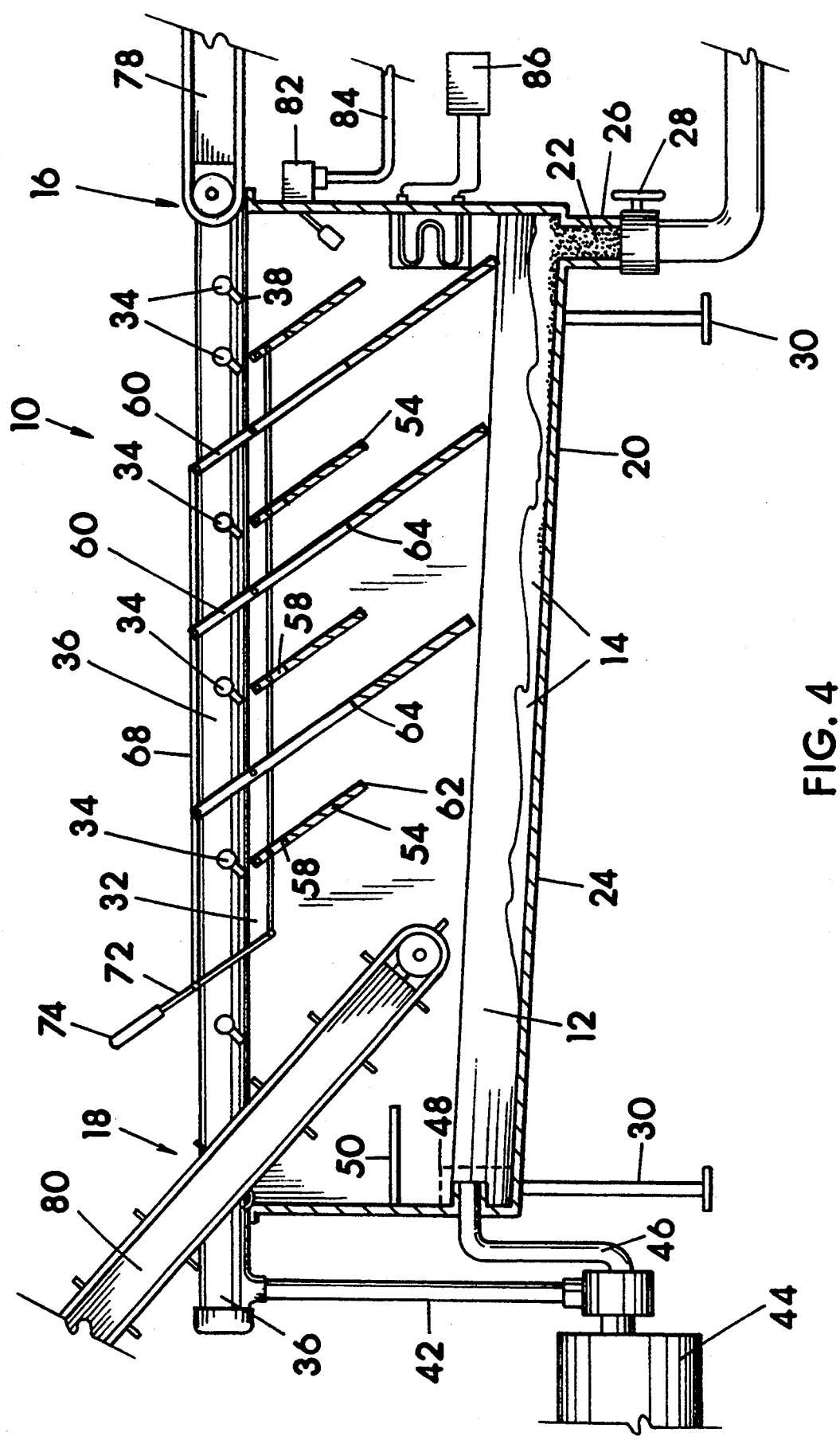
FIG. 4 is a partially cross sectioned side view of the produce washer in a non-operating mode and in the process of being drained.

Depending upon the volume of produce ran through the washer 10, and depending upon just how dirty the produce was, will determine how often the water 14 in tank 12 should be drained and replaced with clean fresh water. Since most of the debris and foreign matter collects in the sloped bottom 20 of tank 12, in order to facilitate the flushing of the settled debris, the lower baffles 56 are preferably pivotally retained so that they may be tilted as shown in FIG. 4, raising the lower edge thereof from bottom 20 during the tank draining and cleaning process. In order to facilitate rapid flushing, upper baffles 54 are also preferably pivotally attached so as not to impede water flowing toward drain 26 when valve 28 is opened. To pivot both upper and lower baffles 52 (52 representing both upper and lower baffles) simultaneously for more efficient drainage of water 14 and easier removal of debris 22, baffles 52 are connected to a leverage and linkage system 66. The upper ends of elongated support arms 60 of lower baffles 56 extend upward past the pivotal joints to just above main water line 36 where the upper terminal ends thereof are pivotally affixed to a horizontal upper linkage member 68, and a lower linkage member 70 is pivotally attached to short support arms 58 of upper baffles 54 just below the pivotal joint thereof. The right ends of both upper linkage member 68 and lower linkage member 70 are pivotally connected to a vertical leverage member 72 affixed with a handle 74. When leverage member 72 is pulled to the right, all baffles 52 are pivoted towards the left side or loading end 16 of tank 12. This allows more free drainage of water 14 towards loading end 16 of tank 12 where drain line 26 is located. Other arrangements to pivot the baffles may of course be used, and lower baffles 56 could be removed from the tank or raised vertically for the draining process, although I prefer an arrangement of pivoting the baffles 52 for cleaning and flushing of the tank 12. Mechanical stops or brakes need to be employed which prevent the strong current in operating mode from pushing the baffles 52 beyond the generally vertical normal position shown in FIG. 1, and toward exit end 18.

Although I have very specifically described the preferred structures of the invention, it should be understood that many changes in the structures shown and described may be made without departing from the true scope of the invention as defined in the appended claims.

What I claim as my invention is:

1. A produce washer comprising an elongated open top tank containing water, a first end of said tank being a loading end whereat produce is first introduced into said produce washer for cleaning, and an oppositely disposed second end of said tank being an exit end whereat cleaned produce is removed from the tank;

a water circulation pump connected to draw water from within said tank from said exit end, said pump further connected to return the drawn water to said tank through a plurality of water output nozzles positioned along said open top of said tank, said output nozzles aiming downward into the water within said tank so that the water from said nozzles will strike produce floating in the water within said tank and push the produce underwater, the drawing of said water and re-applying of the water via said pump and nozzles arranged for creating a current within the water within said tank with said current moving from said loading end toward said exit end of said tank, said current being sufficiently strong to move produce within the water in said tank from said loading end toward said exit end;

a plurality of upper baffles positioned transversely within said tank and in spaced relationship to one another, said upper baffles extending downward within said water contained within said tank and terminating prior to reaching a bottom of said tank so as to provide space between a bottom edge of each upper baffle and the bottom of said tank for said current and the produce to pass thereunder, a plurality of lower baffles positioned transversely within said tank and in spaced relationship to one another, said lower baffles extending upward from said bottom of said tank within said water contained within said tank and terminating prior to reaching a top surface of said water within said tank so as to provide space between a top edge of each lower baffle and the top surface of said water for said current and the produce to pass thereover, said lower baffles positioned in between and in spaced relationship to said upper baffles so as to define a serpentine channel through which said current travels and carries produce in the process of washing the produce.

2. A produce washer comprising an elongated tank containing water, a first end of said tank being a loading end whereat produce is first introduced into said water of said produce washer for cleaning, and an oppositely disposed second end of said tank being an exit end whereat cleaned produce is removed from said tank;

a water circulation pump connected to draw water from within said tank from said exit end, said pump further connected to return the drawn water to said tank through a plurality of water output nozzles, said plurality of water output nozzles aiming into the water within said tank so that the water from the nozzles will strike produce within the water of said tank and impart motion in the produce, the drawing and re-applying of the water via said pump and said plurality of water output nozzles arranged for creating a current within the water within said tank with said current moving from said first end toward said second end of said tank, said current being sufficiently strong to bias the produce within the water in said tank toward moving from said first end toward said second end;

a plurality of individual substantially water impervious baffles positioned within the water within said tank, said baffles in spaced relationship to one another, said baffles extending within the water within said tank and terminating so as to provide space beyond a terminal edge of each baffle within the water for said current and the produce to pass through, the plurality of baffles placed with the terminal edges thereof positioned under the water within said tank and relative to said first and second ends of said tank to define a serpentine path through which said current must travel, the plurality of baffles defining the serpentine current path having said terminal edges positioned so as to require at least periodic complete submergence of produce traveling the serpentine current path, the nozzles of said plurality of water output nozzles placed along said elongated tank with at least one nozzle of said plurality of water output nozzles positioned proximal to each baffle of the plurality of baffles so that water output from the nozzles will strike the produce and impart motion therein to aid in moving the produce being drawn by said current to move beyond the terminal edges of the baffles when drawn by said current from said first end toward said second end of said produce washer.

* * * * *